(12) United States Patent
Wang et al.

(10) Patent No.: US 10,739,467 B2
(45) Date of Patent: Aug. 11, 2020

(54) METHODS AND SYSTEMS FOR TESTING SATELLITE SIGNAL RECEIVER ANTENNA

(71) Applicant: Intelligent Fusion Technology, Inc, Germantown, MD (US)

(72) Inventors: Zhonghai Wang, Germantown, MD (US); Bin Jia, Germantown, MD (US); Xingping Lin, Germantown, MD (US); Tao Wang, Germantown, MD (US); Xingyu Xiang, Germantown, MD (US); Genshe Chen, Germantown, MD (US); Dan Shen, Germantown, MD (US); Khanh Pham, Kirtland AFB, NM (US); Erik Blasch, Rome, NY (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 331 days.

(21) Appl. No.: 15/874,526

(22) Filed: Jan. 18, 2018

(65) Prior Publication Data

US 2019/0219706 A1     Jul. 18, 2019

(51) Int. Cl.
*G01S 19/23* (2010.01)
*H01Q 3/02* (2006.01)
*H01Q 3/26* (2006.01)
*H01Q 1/28* (2006.01)

(52) U.S. Cl.
CPC ............. *G01S 19/23* (2013.01); *H01Q 3/02* (2013.01); *H01Q 3/267* (2013.01); *H01Q 1/288* (2013.01)

(58) Field of Classification Search
CPC .......... G01S 19/23; H01Q 1/288; H01Q 3/02; H01Q 3/267
See application file for complete search history.

(56) References Cited

U.S. PATENT DOCUMENTS

| | | | |
|---|---|---|---|
| 2008/0085704 A1* | 4/2008 | Dieudonne | G01S 19/23 455/423 |
| 2010/0156709 A1* | 6/2010 | Zhang | G01S 19/41 342/357.23 |
| 2013/0271317 A1* | 10/2013 | Goel | G01S 19/23 342/357.62 |
| 2014/0225774 A1* | 8/2014 | Boulton | G01S 19/23 342/357.62 |
| 2016/0011318 A1* | 1/2016 | Cohen | G01S 19/29 342/357.26 |

* cited by examiner

*Primary Examiner* — Timothy X Pham
(74) *Attorney, Agent, or Firm* — Anova Law Group, PLLC

(57) ABSTRACT

A method for testing satellite signal receiver antenna is provided. The method includes: determining a satellite constellation state indicating status of a plurality of satellites in a satellite constellation; calculating, based on the determined satellite constellation state, initial positions of a plurality of satellite antennas that are used for emulating the satellite constellation; moving the plurality of satellite antennas to the initial positions of the plurality of satellite antennas; calibrating a phase delay of each of the plurality of satellite antennas; broadcasting, by the plurality of satellite antennas, satellite signals to test a satellite signal receiver antenna; determining a movement plan for the plurality of satellite antennas based on the satellite constellation state; and moving the plurality of satellite antennas based on the movement plan to emulate a propagation of the satellite constellation.

17 Claims, 3 Drawing Sheets

METHODS AND SYSTEMS FOR TESTING SATELLITE SIGNAL RECEIVER ANTENNA

GOVERNMENT RIGHTS

This invention was made with Government support under Contract No. W91RUS-17-P-0020, awarded by the United States Army. The U.S. Government has certain rights in the present disclosure.

TECHNICAL FIELD

The present disclosure generally relates to the field of antenna testing technology, and more particularly, relates to methods and systems for testing satellite signal receiver antenna.

BACKGROUND

Satellite signal receivers, such as Global Positioning System (GPS) receivers, are facing increasing challenges in terms of jamming. New antenna techniques are applied to suppress jamming signals and maintain satellite signal receiver performance.

Before the deployment of a satellite signal receiver antenna, its performance should be tested in the presence of jamming. However, typical laboratory satellite signal receiver antenna testing lacks realism compared to live testing. Current laboratory test configurations do not precisely represent the motion of the orbiting satellites with respect to the satellite signal receiver antenna being tested. The spatial relationships between satellites and the satellite signal receiver antenna under test is either ignored (when injecting the satellite signals into the satellite signal receiver's radio frequency (RF) input port) or approximated (tripods/fixed satellite positions) for a short time period, since the live satellites are constantly in motion.

Accordingly, it is desirable to provide methods and systems for testing satellite signal receiver antenna under jamming scenarios.

BRIEF SUMMARY

An aspect of the present disclosure provides a method for testing satellite signal receiver antenna, including: determining a satellite constellation state indicating status of a plurality of satellites in a satellite constellation; calculating, based on the determined satellite constellation state, initial positions of the plurality of satellites in the satellite constellation to determine initial positions of a plurality of satellite antennas that are used for emulating the satellite constellation; moving the plurality of satellite antennas to the initial positions of the plurality of satellite antennas; calibrating a phase delay of each of the plurality of satellite antennas; broadcasting, by the plurality of satellite antennas, satellite signals to test a satellite signal receiver antenna; determining a movement plan for the plurality of satellite antennas based on the satellite constellation propagation; and moving the plurality of satellite antennas based on the movement plan to emulate the propagation of the satellite constellation.

In some embodiments, the satellite constellation is one of Global Positioning System (GPS), Global'naya Navigatsionnaya Sputnikovaya Sistema (GLONASS), Galileo positioning system, and BeiDou Navigation Satellite System; and the satellite constellation state at least includes orbits information of the satellites in the satellite constellation.

In some embodiments, the method further includes: using a rail to emulate an orbit each of the plurality of satellites in the satellite constellation; where moving the plurality of satellite antennas including moving a trolley carrying one of the plurality of satellite antennas on the rail.

In some embodiments, moving the plurality of satellite antennas further includes: sending a control command to the trolley carrying one of the plurality of satellite antennas on the rail through a wireless communication channel; and in response to receiving the control command, moving the trolley carrying one of the plurality of satellite antennas on the rail at a constant speed.

In some embodiments, calculating initial positions of the plurality of satellites in the satellite constellation to determine initial positions of the plurality of satellite antennas includes: calculating initial angular positions of the plurality of satellites in the satellite constellation in a global coordinate based on the determined satellite constellation state; and determining initial angular positions of the plurality of satellite antennas on the rails based on the initial angular positions of the plurality of satellites in the satellite constellation in the global coordinate.

In some embodiments, calibrating the phase delay of each of the plurality of satellite antennas includes: measuring a phase delay for each of the plurality of satellite antennas; calculating phase delay differences among the phase delays of the plurality of satellite antennas; using the phase delay differences to calibrate the phase delay of each of the plurality of satellite antennas, such that the phase differences of the plurality of satellite antennas are eliminated.

In some embodiments, broadcasting the satellite signals includes: generating satellite signals for the plurality of satellite antennas by a satellite simulation system; and transmitting the satellite signals to the plurality of satellite antennas through a plurality of radio frequency cables, where each radio frequency cable connects one of the plurality of satellite antennas to the satellite simulation system.

In some embodiments, moving the plurality of satellite antennas further includes: releasing or retreating, by a cable management system, each radio frequency cable that is connecting one of the plurality of satellite antennas and the satellite simulation system.

In some embodiments, determining a movement plan for the plurality of satellite antennas includes: extracting expected positions of the plurality of satellites in the satellite constellation at a next time point from the satellite simulation system; calculating expected positions of the plurality of satellite antennas on the rails to emulate the expected positions of the plurality of satellites in the satellite constellation at the next time point; measuring current positions of the plurality of satellite antennas on the rails; and determining the movement plan for the plurality of satellite antennas moving from the current position to the expected position on the rails, respectively, based on the current positions of the plurality of satellite antennas on the rails, and the expected positions of the plurality of satellite antennas on the rails at the next time point.

In some embodiments, measuring current positions of the plurality of satellite antennas on the rails includes: capturing, by a plurality of cameras, images of the plurality of satellite antennas on the rails; processing the images captured by the multiple cameras to identify the plurality of satellite antennas; and obtaining current angular positions of the plurality of satellite antennas.

In some embodiments, obtaining the current angular positions of the plurality of satellite antennas includes:

measuring a current local angular position of one satellite antenna in an image in a local coordinate system with respect to a camera that captures the image; and calculating the current angular position of the satellite antenna in a global coordinate system based on the current local angular position of the satellite antenna in the local coordinates, a radius of a rail that the one satellite antenna is located on, and a location of the camera in the global coordinates.

Another aspect of the present disclosure provides a system for testing satellite signal receiver antenna, including: a plurality of satellite antennas configured for emulating a plurality of satellites in a satellite constellation; a plurality of rails configured for emulating orbits of the plurality of satellites in the satellite constellation; a satellite positioning system configured for determining a propagation of the plurality of satellites in the satellite constellation; and a satellite simulation system configured for generating emulated satellite signals; where the plurality of satellite antennas are able to broadcast the emulated satellite signals while moving along the plurality of rails, respectively, based on the propagation of the plurality of satellites in the satellite constellation.

In some embodiments, the system further includes: a plurality of radio frequency cables for transmitting the emulated satellite signals from the simulation system to the plurality of satellite antennas; where each of plurality of radio frequency cables connects one plurality of satellite antennas to the satellite simulation system.

In some embodiments, the system further includes a cable management system configured for: releasing or retreating the plurality of radio frequency cables when the plurality of satellite antennas are moving along the plurality of rails respectively; and providing low phase and time delay change of the emulated satellite signals.

In some embodiments, the cable management system at least includes a fixed pulley, a movable pulley, and a tension part; where a radio frequency cable is restrained by the fixed pulley, the movable pulley, and the tension part.

In some embodiments, the system further includes: a low noise amplifier between the plurality of radio frequency cables and the simulation system; where the low noise amplifier is configured to amplify emulated satellite signals to a desired strength level by compensating power losses due to the radio frequency cables and distances between the plurality of satellite antennas and a satellite signal receiver antenna under test.

In some embodiments, the system further includes a plurality of cameras configured for capturing images of the plurality of satellite antennas.

In some embodiments, the system further includes a plurality of trolleys that are able to move on the plurality of rails respectively; where each of the plurality of trolleys carries one of the plurality of satellite antennas.

In some embodiments, the system further includes a computer configured for: calibrating a phase delay of each of the plurality of satellite antennas; processing the images of the plurality of satellite antennas to determine current positions of the plurality of satellite antennas; determining a movement plan for the plurality of satellite antennas based on the current positions of the plurality of satellite antennas and the propagation of the plurality of satellites in the satellite constellation; and sending control commands to the plurality of trolleys to move the plurality of trolleys, such that movements of the plurality of satellite antennas carried by the plurality of trolleys emulate the propagation of the plurality of satellites in the satellite constellation.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments of the present disclosure, methods and systems for testing satellite signal receiver antenna performance in the presence or absence of jamming are provided. The disclosed methods and systems can provide a complimentary test capability that can emulate outdoor satellite signal receiver testing and greatly reduce the amount of outdoor test events.

The disclosed methods and systems can provide an indoor satellite signal testing environment considering the relative position of the satellite signal receiver antenna under test and the satellite constellation. The disclosed methods and systems can greatly improve the satellite signal receiver antenna testing capability and accuracy, and can greatly reduce the frequency and number of outdoor satellite signal receiver tests that need spectrum coordination at local, regional, and national levels.

In some embodiments, the satellites can be referred to a global navigation satellite system (GNSS), such as the Global Positioning System (GPS), the Global'naya Navigatsionnaya Sputnikovaya Sistema (GLONASS), the Galileo positioning system, the BeiDou Navigation Satellite System, or other similar satellite systems.

In some other embodiments, the satellite can be referred to the Iridium and Globalstar satellite constellation, the Disaster Monitoring Constellation, RapidEye RapidEye, Orbcomm satellites, Russian elliptic orbit Molniya and Tundra constellations, the large-scale Teledesic and Skybridge broadband constellation, O3b constellation, and the OneWeb satellite constellation, or other similar satellite systems.

In some embodiments, the satellite signal receiver antenna can be any suitable receiver antenna that can receive signals emitted from the satellites. It is noted that, in the following description, GPS satellites and GPS receiver antenna are used as examples to demonstrate the disclosed methods and systems.

Figure 1:
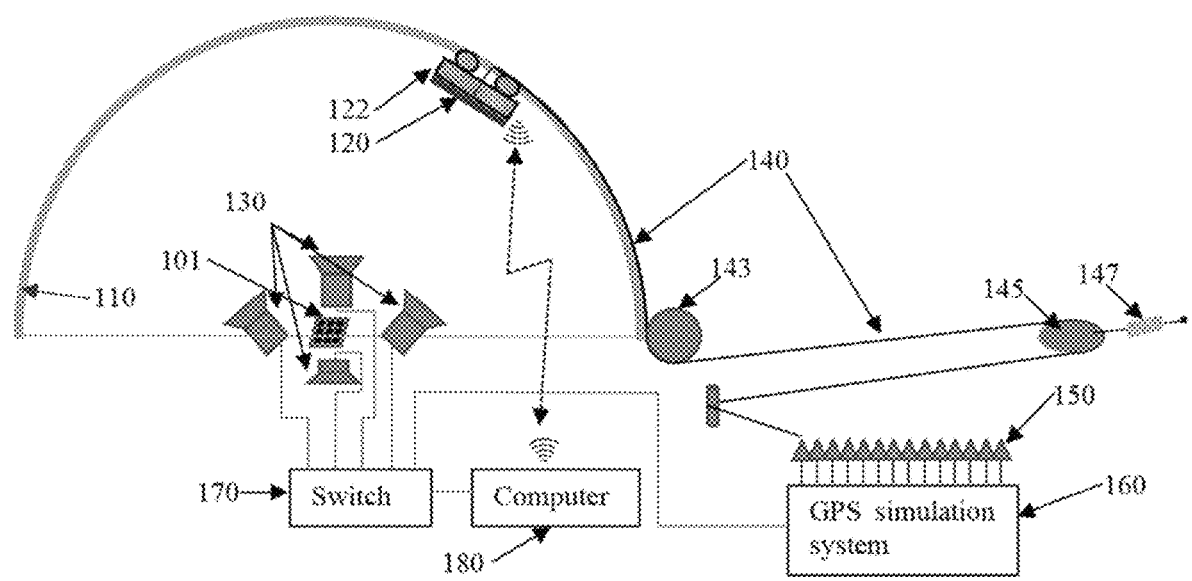
FIG. 1 illustrates a schematic diagram of an exemplary system for testing satellite signal receiver antenna in accordance with some embodiments of the present disclosure.

Referring to FIG. 1, a schematic diagram of an exemplary system for testing satellite signal receiver antenna is shown in accordance with some embodiments of the present disclosure. The system can include a GPS receiver antenna 101 under test, multiple rails 110, a set of GPS antennas 120, and a control system.

The multiple rails 110 can emulate multiple GPS satellite orbits. In some embodiments, each of the multiple rails 110 may have a semi-circular shape. Each of the set of GPS antennas 120 can be carried by a trolley 122 walking on one rail 110 to emulate a GPS satellite antenna. In some embodiments, the multiple rails 110 can be installed with guy wires or an installation structure, or a combination of the installation structure and guy wires. Each rail 110 can have a gear rack for the trolley travelling on the rail 110.

On each rail 110, there can be multiple trolleys 122 carrying GPS antennas 120 to emulate GPS satellites. FIG. 1 shows one trolley 122 carrying one GPS antenna 120 for simplicity and clear demonstration. All trolleys 122 can move on multiple rails 110 under the control of the control system to emulate the GPS satellite constellation propagation. It is noted that, any suitable mechanism other than the trolley 122 can be used to carry the GPS antenna 120 to move along the corresponding rail 110.

In one specific example, the multiple rails 110 can include six rails 110, and each rail 110 can support one or multiple trolleys 122 and GPS antennas 120. That is, such arrangement can emulate twelve or more GPS satellites and six GPS satellites orbits, where two GPS satellites are on each GPS satellite orbit. It is noted that, the radius of the multiple rails 110 can be different. In some embodiments, the rail radius difference between adjacent two rails 110 can depend on the size of the trolley and the GPS antenna, and the rail width. Thus, as the trolley carrying GPS antenna moves along the rail, it will not interfere with other rails and/or trolleys.

The control system, coordinated through the computer 180, can control the movement of each GPS antenna 120 along with the corresponding trolley 122 on the rail 110 to emulate the relative angular movement of the GPS satellite with respect to the GPS receiver antenna 101 under test. In some embodiments, the control system can include a set of cameras 130, multiple radio frequency (RF) cables 140, a cable management system, a GPS signal boosting module, a GPS simulation system 160, a switch 170, and a computer 180.

In some embodiments, the set of GPS antennas 120 can be a set of right hand circular polarization (RHCP) GPS antenna. The set of GPS antennas 120 can have a low gain and a wide beam width. Each GPS antenna 120 can be connected to the GPS simulation system 160 on a specific output port to emulate a specific GPS satellite via a radio frequency (RF) cable 140.

As shown in FIG. 1, the GPS signal boosting module can include multiple low noise amplifiers (LNAs) 150. Each GPS antenna 120 can be connected to one LNA 150, and the LNA 150 can be connected to one of the output ports of the GPS simulation system 160. Each LAN 150 can amplify the GPS signal to a desired strength level by compensating the power loss due to the RF cable 140 and the distance between the GPS antenna 120 and the GPS receiver antenna 101 under test.

The set of cameras 130 can be used to monitor the movements of the set of GPS antennas 120. That is, the movements of the set of GPS antennas 120 can be in a combined field of view (FOV) of the set of cameras 130. In some embodiments, the set of cameras 130 can be connected to the computer 180 via a switch 170. The switch 170 can be used for image transformation from the set of cameras 130 to the computer 180.

An image processing algorithm can be implemented on the computer 180 for processing the images captured by the set of cameras 130. By processing the images, the set of GPS antennas 120 can be detected and identified. In some embodiments, any suitable object recognition technique can be used to detect and identify the set of GPS antennas 120 and/or the multiple trolleys 122.

After locating the set of GPS antennas 120 and/or the multiple trolleys 122, the angular position of each GPS antenna can be calculated in the cameras' local coordinate system. Using the measured angle of the GPS antenna with respect to the camera, the radius of the rail that the GPS antenna is located, and the camera location in the global coordinate system, the GPS antenna position in the global coordinate can be calculated for each GPS antenna 120.

The GPS simulation system 160 can be connected with the computer 180 via the switch 170. The GPS simulation system 160 can be connected with the set of GPS antennas 120 via the multiple radio frequency (RF) cables 140 and the multiple low noise amplifiers (LNAs) 150. In some embodiments, the GPS simulation system 160 can be a multi-channel GPS simulation system that provides GPS signals and GPS satellite state information to the set of GPS antennas 120 and the computer 180. Each GPS antenna 120 can emit a specific GPS signal coming from the GPS simulation system 160 via a RF cable 140 and an LNA 150.

In some embodiments, the system can include a satellite positioning control module for controlling the movement of the set of GPS antennas 120. For example, the satellite positioning control module can be realized by implementing a satellite positioning control software. The satellite positioning software running on the computer 180 can include GPS satellite position extraction module to extract the GPS satellite position information of a GPS satellite from the digital output of the GPS simulation system 160. Further, as described above, the satellite positioning software can process the images captured by the set of cameras 130, and calculate the GPS antenna 120 current position in the global coordinate. The computer 180 can also act as the control system.

Based on the extracted GPS satellites' positions in the GPS satellite constellation and the measured GPS antennas' current positions, the satellite positioning software can calculate the corresponding movement of each GPS antenna from the current position on the rail 110 to a proper position on the rail 110 that corresponds to the extracted GPS satellite's position in the GPS satellite constellation in the global coordinate reference frame.

The movement information of each GPS antenna can be sent to a trolley control module. As such, the trolley control module can control the movement of the multiple trolleys 122 that carry the multiple GPS antennas 120 to move each GPS antenna 120 from the current position to the extracted GPS satellite's position in the GPS satellite constellation. For example, the trolley control module can send a control command to each of the multiple trolleys 122 through a wireless communication channel, such as a WiFi channel, a Bluetooth channel, an infrared (IF) signal channel, or other communication device.

Each trolley 122 can response to the control command to move to the proper position on the rail 110 that corresponds to the extracted GPS satellite's position in the GPS satellite constellation in the global coordinate reference frame.

During the movement of the trolley 122, a cable management system can release or retreat the RF cable 140 that connects the GPS antenna 120 carried by the trolley 122 and the GPS simulation system output port through a low noise amplifier (LNA). In some embodiments, each cable management system can include one or more pulleys. A corresponding RF cable 140 connecting the LNA 150 and the GPS antenna 120 can be restrained by one or more pulleys. For example, as shown in FIG. 1, the cable management system can include a fixed pulley 143, a movable pulley 145, and a tension part 147. The RF cable 140 can be restrained by the rail 110, the fixed pulley 143, the movable pulley 145, the tension part 147, and a fixed column. One end of the RF cable 140 is connected to the LNA 150 and another end of the RF cable 140 is connected to the GPS antenna 120.

Controlled by the cable management system, each RF cable 140 can be released or retreated along the movement of the corresponding GPS antenna 120 and/or the trolley 122 on the rail 110. The emulated satellite signals generated by the GPS simulation system 160 can be transmitted to each of the multiple GPS antennas 120 through the RF cables 140. That is, the movements of the set of GPS antennas 120 and/or the trolleys 122 on the rails 110 can be used to emulate the GPS satellite constellation propagation. Therefore, the set of GPS antennas 120 may have the same relative angular positions with respect to the GPS receiver antenna 101 under test.

Further, the cable management system can be used to provide low phase and time delay change in the emulation process. As the cable is released or retreated by the cable management system, a low phase delay change and a low time delay change are provided for the emulation process that is needed for the anti jamming GPS receiver antenna test.

Accordingly, the present disclosure provides a method to test an anti jamming GPS receiver antenna in the presence or absence of a jamming signal. The anti jamming GPS receiver antenna testing system can be directly applied for anti jamming GPS receiver antenna test. The anti jamming GPS receiver antenna testing system can also be applied for anti jamming communication system antenna test by changing the GPS simulation system 160 to a communication system. The anti jamming GPS receiver antenna testing system can also be applied for testing radar antenna performance in a jamming/interference environment.

It is noted that, for simplicity and clear demonstration, only one rail 110, one GPS antennas 120, and one trolley 122 are shown in FIG. 1. However, any suitable number of rails can be used in some embodiments. The number of the rails is not to be treated as a limitation of the present disclosure.

Figure 2:
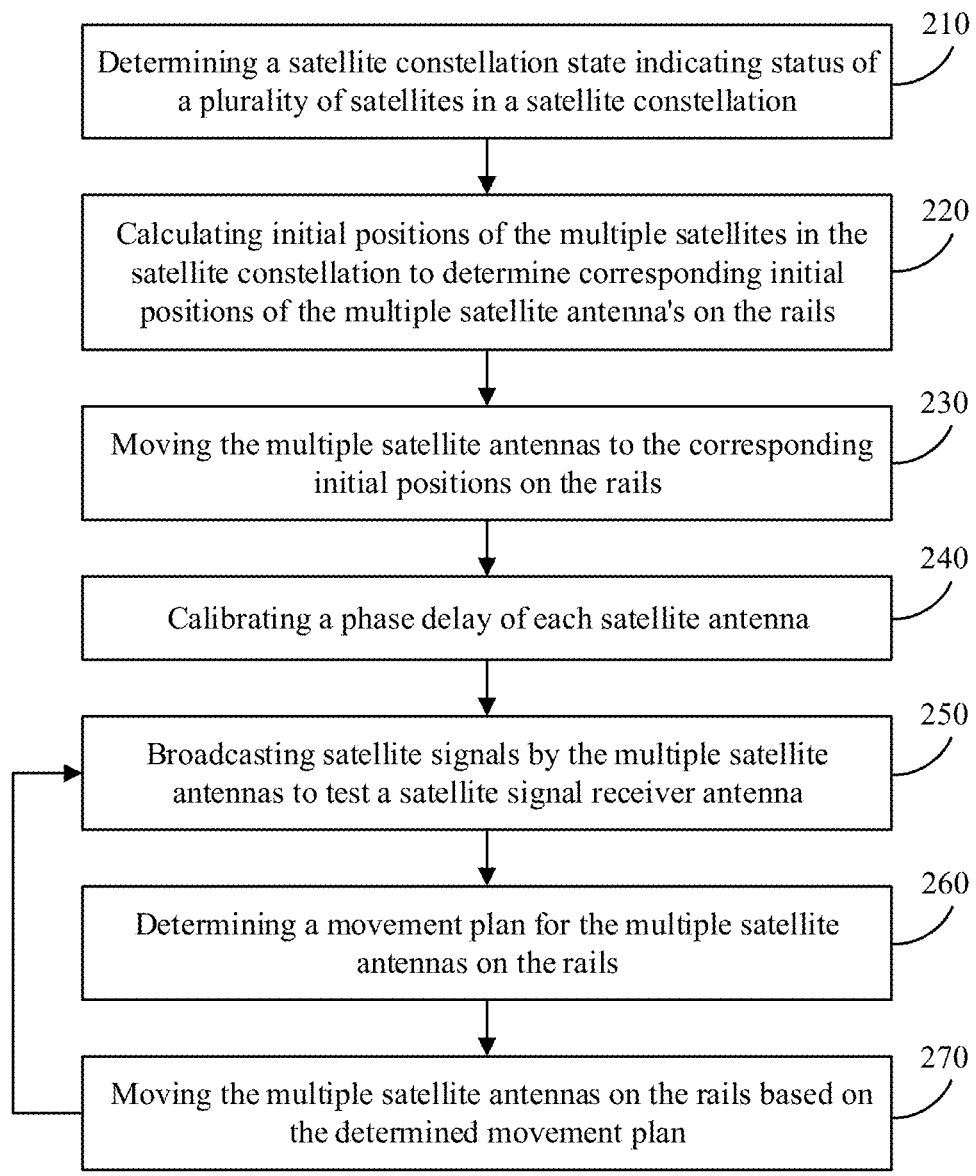
FIG. 2 illustrates a schematic flow diagram of an exemplary method for testing satellite signal receiver antenna in accordance with some embodiments of the present disclosure.

Referring to FIG. 2, a flow diagram of an exemplary anti jamming GPS receiver antenna testing method is shown in accordance with some embodiments of the disclosed subject matter. The anti-jamming GPS receiver antenna testing method can include exemplary processes described in the following.

At 210, a satellite constellation state indicating the positions and time of a plurality of satellites in a satellite constellation. In some embodiments, a satellite constellation can be a group of representative satellites working in concert. Such a satellite constellation can be considered to be a number of satellites with coordinated ground coverage, operating together under shared control, synchronized so that the number of satellites can overlap well in coverage.

For example, the satellite constellation may be one global navigation satellite system (GNSS) for navigation and geodesy, such as the Global Positioning System (GPS), the Global'naya Navigatsionnaya Sputnikovaya Sistema (GLONASS), the Galileo positioning system, and the BeiDou Navigation Satellite System, or other constellation. As another example, the satellite constellation may be the Iridium and Globalstar satellite constellation, the Disaster Monitoring Constellation and RapidEye constellation for remote sensing, the Orbcomm constellation for messaging service, Russian elliptic orbit Molniya and Tundra constellations, the large-scale Teledesic and Skybridge broadband constellation, O3b constellation, the OneWeb satellite constellation, or other similar systems.

In some embodiments, the satellite constellation state may indicate a number of types of properties of the satellites in the satellite constellation, including orbit information, signal information, service information, and any other suitable information of the satellites in the satellite constellation.

At 220, based on the determined satellite constellation state, initial positions of the multiple satellites in the satellite constellation can be calculated to determine corresponding initial positions of the multiple satellite antennas on the rails.

In some embodiments, according to the number of satellites in the satellite constellation, orbits information of satellites in the satellite constellation, and any other suitable information indicated by the determined satellite constellation state, the initial positions of the multiple satellites in the satellite constellation can be calculated by a satellite simulation system, such as a GPS simulation system 160 as shown in FIG. 1. The initial positions of the multiple satellites in the satellite constellation can be represented in a global coordinate reference frame, such as a spherical coordinate system with respect to the center of the earth.

As shown in FIG. 1, multiple satellite antennas, each carried by a trolley, moving on the rails respectively can be used to emulate the satellite constellation propagation. That is, the multiple satellite antennas and the multiple satellites in the satellite constellation share the same angular coordinates with respect to the antenna under test. As such, based on the initial positions of the multiple satellites in the satellite constellation, the corresponding initial positions of the multiple satellite antennas on the rails can be determined.

At 230, the multiple satellite antennas can be moved to the corresponding initial positions on the rails by a trolley control module.

In some embodiments, the multiple satellite antennas can be a set of right hand circular polarization (RHCP) satellite antennas with a low gain and a wide beam width. Each satellite antenna can be connected to the satellite simulation system on a specific output port to emulate a specific satellite in the satellite constellation via a radio frequency (RF) cable.

As shown in FIG. 1, a trolley control module can be used to control the movement of a corresponding trolley carrying a satellite antenna on the rail. By calculating the corresponding initial positions of the multiple satellite antennas on the rails using the extracted satellites position from the satellite simulation system, the trolley control module can move the corresponding trolleys carrying the satellite antennas to proper positions on the rails. During the movement of the trolleys, a cable management system can be used to release or retreat each RF cable that connects the corresponding satellite antenna and the satellite simulation system.

It is noted that, a common center of the multiple rails that have a circular shape can represent the center of the earth. The antenna under test is at the emulated earth center. Such that, as the multiple satellite antennas move on the rails, the distances from the antenna under test to the multiple satellite antennas do not change.

At 240, a phase delay of each satellite antenna can be calibrated.

In some embodiments, a phase delay for each satellite antenna can be measured, and phase delay differences among the measured phase delays of the multiple satellite antennas can be calculated. Based on the calculated phase delay differences, the phase delay of each satellite antenna can be calibrated.

In some embodiments, the signals generated by the satellite simulation system to emulate the signals emitted from the multiple satellites in the satellite constellation can traverse through the RF cables respectively to reach the corresponding satellite antennas. Since the multiple satellite antennas are moved to the initial positions on the rails at 230, and the multiple rails have differences radius, the multiple RF cables connecting to the multiple satellite antennas respectively can have different lengths. As such, for each satellite antenna, based on the length of the corresponding RF cable connecting to the satellite antenna, a phase delay of the signal transmitted through the corresponding RF cable can be measured.

Further, the phase delay differences between one satellite antenna and other satellite antennas can be calculated based on the measured phase delays of the multiple satellite antennas. Using the calculated phase delay differences, the phase delay of each satellite antenna can be calibrated to eliminate or minimize the phase differences of the multiple satellite antennas generated by the RF cable and the rail radius's differences. Thus, the phases of the satellite signals emitted from the multiple satellite antennas can be synchronized.

At 250, the multiple satellite antennas can broadcast satellite signals to test a satellite signal receiver antenna.

In some embodiments, the satellite signals can be generated by the satellite simulation system. For example, the GPS signals can be generated by a GPS simulation system. The satellite signals can be transmitted to the multiple satellite antennas respectively through the corresponding RF cables. The multiple satellite antennas can broadcast the received satellite signals to the antenna under test.

Since the each satellite antenna has the same angular position as the corresponding satellites in the satellite constellation with respect to the antenna under test, the satellite signals broadcasted by the multiple satellite antennas can emulate the real satellite signals with the angle of arrival information that are broadcasted by the multiple satellites in the satellite constellation. Therefore, by receiving the satellite signals broadcasted by the multiple satellite antennas, the anti-jamming capability of a satellite signal receiver antenna, such as a GPS receiver antenna, can be tested.

At 260, a movement plan for the multiple satellite antennas on the rails can be determined.

In some embodiments, the positions of the multiple satellites in the satellite constellation at a next time point can be extracted from the satellite simulation system, and the corresponding expected positions of the multiple satellite antennas on the rails to emulate the expected positions of the multiple satellites in the satellite constellation at the next time point can be calculated.

Since the multiple satellites in the satellite constellation are moving along their orbits respectively over time, during the process for testing satellite signal receiver antenna, the multiple satellite antennas are also moving over the time on the rails to emulate the propagation of the satellite constellation. Thus, the satellite simulation system can calculate the changing of the positions of the multiple satellites in the satellite constellation over time based on the orbits information, the initial positions, and any other suitable information of the multiple satellites in the satellite constellation.

As such, the expected positions of the multiple satellites in the satellite constellation at the next time point can be extracted from the satellite simulation system. It is noted that, a time period between adjacent time points can be a constant that is referred to as a minimum time scale for calculating the propagation of the satellite constellation. That is, the time period between adjacent time points can determine a refresh rate of the positions of the multiple satellites in the satellite constellation. In some embodiments, a refresh rate of the positions of the multiple satellites in the satellite constellation can be within a range between 0.1 Hz and 100 Hz.

Similar to 220, based on the expected positions of the multiple satellites in the satellite constellation at the next time point, the corresponding expected positions of the multiple satellite antennas on the rails can be determined in the global coordinate reference frame to emulate the positions of the multiple satellites in the satellite constellation at the next time point.

Further, the current positions of the multiple satellite antennas on the rails can be measured. It is noted that, the current positions of the multiple satellite antennas on the rails can be measured by using any suitable technique, such as image processing and positioning technique, ultrasonic positioning technology, infrared positioning technology, laser positioning technology, grating positioning technology, or other measurement capability.

In one example, as shown in FIG. 1, multiple cameras can be used to monitor the multiple satellite antennas. In some embodiments, an object recognition technique can be used to process the images captured by the multiple cameras to identify the multiple satellite antennas. After locating each satellite antenna, the angular position of each satellite antenna can be measured in a local coordinate system. Using the measured angle of the satellite antenna with respect to the camera, the radius of the rail that the satellite antenna is located, and the camera location in the global coordinate reference frame, the current position of the satellite antenna on the rail in the global coordinate reference frame can be calculated.

Based on the current positions of the satellite antennas on the rails, and the expected positions of the multiple satellite antennas on the rails at the next time point, a movement plan can be made for moving each satellite antenna from the current position to the expected position on the rails respectively. In some embodiments, one or more control commands can be generated based on the movement plan to control the movement of the multiple satellite antennas on the rails. For example, a trolley control module can generate and send a control command to each trolley that carries a satellite antenna moving on the corresponding rail.

At 270, the multiple satellite antennas can be moved on the rails based on the determined movement plan.

In some embodiments, the trolleys carrying the multiple satellite antennas respectively can receive the control commands sent by the trolley control module through a wireless communication channel, such as a WiFi channel, a Bluetooth channel, an infrared (IF) signal channel, or other device. In response to receiving the control command, each trolley can move from the current position to the expected position at a constant speed on the rail during the time period between adjacent time points. During the movement of the trolleys, the cable management system can be used to release or retreat each RF cable that connects the satellite antenna and the satellite simulation system.

The steps 250, 260 and 270 can be repeated during the process for testing satellite signal receiver antenna, such that the multiple satellite antennas can continually broadcast satellite signals during the movement to test the satellite signal receiver antenna. Therefore, the movement of the multiple satellite antennas can emulate the propagation of the satellite constellation. The satellite signal receiver antenna under test can continuously receive the emulated satellite signals from the multiple satellite antennas during the testing process.

It should be noted that the above steps of the flow diagram of FIG. 2 can be executed or performed in any order or sequence not limited to the order and sequence shown and described in the figure. Also, some of the above steps of the flow diagram of FIG. 2 can be executed or performed substantially simultaneously where appropriate or in parallel to reduce latency and processing times. For example, steps 250, 260 and 270 can be performed simultaneously, such that the multiple satellite antennas can broadcasting satellite signals while moving on the rails. Furthermore, it should be noted that FIG. 2 are provided as examples only. At least some of the steps shown in the FIG. 2 may be performed in a different order than represented, performed concurrently, or altogether omitted.

Figure 3:
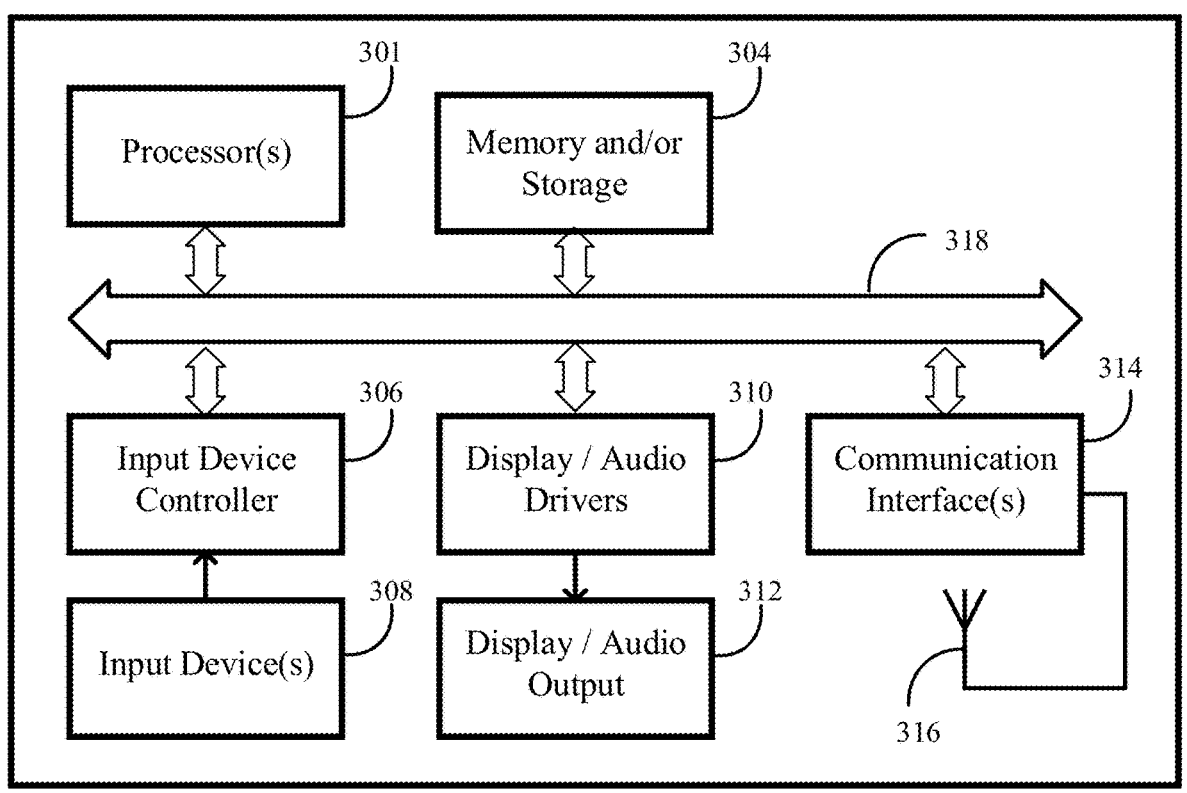
FIG. 3 illustrates a schematic diagram of exemplary hardware of a computer and or a satellite simulation system in a test harness for assessing satellite signal receiver antenna performance in the presence or absence of jamming in accordance with some embodiments of the present disclosure.

Referring to FIG. 3, a schematic diagram of exemplary hardware of a computer and or a satellite simulation system in a system for testing the satellite signal receiver antenna is shown in accordance with some embodiments of the present disclosure.

In some embodiments, the computer and/or the satellite simulation system can be implemented as a mobile phone, a tablet computer, a laptop computer, a desktop computer, a server, and/or any other suitable computing device. The computer and/or the satellite simulation system can be integrated together as one computing unit, or can be separately located but be connected with each other via a network switch, As illustrated, the hardware of the computer and/or the satellite simulation system can include at least one hardware processor 301, memory and/or storage 304, an input device controller 306, an input device 308, display/audio drivers 310, display and audio output circuitry 312, communication interface(s) 314, one or more antennas 316, a bus 318, and any other suitable components.

The at least one hardware processor 301 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 301 can implement or execute some processes in various embodiments of the present disclosure including one or more method, operations and block/logic diagrams. For example, as described above in connection with FIG. 2, the at least one hardware processor 301 can perform at least some of the steps/operations and/or functions of the processes and/or modules.

The steps/operations of the disclosed method in various embodiments can be directly executed by a combination of the at least one hardware processor 301 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 304. The at least one hardware processor 301 can implement the steps/operations of the disclosed method by combining the hardware and the information read from the memory and/or storage 304.

The memory and/or storage 304 can be any suitable memory and/or storage for storing programs, data, media content, comments, information of users and/or any other suitable content in some embodiments. In some embodiments, the memory and/or storage 304 can include a non-transitory computer-readable medium containing computer-executable instructions that, when executed by the at least one hardware processor 301, cause the hardware processor to perform at least some of the steps/operations and/or functions of the disclosed method as described above in connection with FIG. 2.

For example, memory and/or storage 304 can include random access memory, read only memory, flash memory, hard disk storage, optical media, and/or any other suitable storage device.

The input device controller 306 can be any suitable circuitry for controlling and receiving input from one or more input devices 308 in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

The display/audio drivers 310 can be any suitable circuitry for controlling and driving output to one or more display and audio output circuitries 312 in some embodiments. For example, display/audio drivers 310 can be circuitry for driving a liquid crystal display (LCD) display, a speaker, a light emitted diode (LED), and/or any other display/audio device. The display/audio device may also include voice commands for controlling a satellite in the satellite constellation.

The communication interface(s) 314 can be any suitable circuitry for interfacing with one or more communication networks. For example, interface(s) 314 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

The one or more antennas 316 can be any suitable one or more antennas for wirelessly communicating with a communication network in some embodiments. The bus 318 can be any suitable mechanism for communicating between two or more of components 301, 304, 306, 310, and 314 in some embodiments. The bus 318 can be divided into an address bus, a data bus, a control bus, or other integrating circuitry. The bus 318 is represented as a two-way arrow in FIG. 3, but it does not mean that it is only one type bus or only one bus.

It is noted that, any other suitable components not shown in FIG. 3 can be included in the hardware in accordance with some embodiments, while any unnecessary components shown in FIG. 3 may also be omitted in the hardware in accordance with some other embodiments.

In some embodiments, some portions of the data flow diagrams and block diagrams in the figures illustrate various embodiments of the disclosed method and system, as well as some portions of architectures, functions and operations that can be implemented by computer program products. In this case, some blocks of the flow diagram or block diagram may represent a module, a code segment, a portion of program code. Each module, each code segment, and each portion of program code can include one or more executable instructions for implementing predetermined logical functions.

It should also be noted that, each block in the block diagram and/or flow diagram, as well as the combinations of the blocks in the block diagram and/or flow diagram, can be realized by a dedicated hardware-based system for executing specific functions, or can be realized by a dedicated system combined by hardware and computer instructions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, or any other suitable media that is fleeting and devoid of any semblance of permanence during transmission, and/or any suitable intangible media.

The provision of the examples described herein (as well as clauses phrased as "such as," "e.g.," "including," "etc.", and the like) should not be interpreted as limiting the claimed present disclosure to the specific examples; rather, the examples are intended to illustrate only some of many possible aspects.

Accordingly, a satellite receiver antenna testing system and a satellite receiver antenna testing method are provided in some embodiments of the present disclosure. The disclosed method and system for testing satellite signal receiver antenna can be applied to emulate an anti jamming GPS satellite constellation with multiple GPS satellites.

The emulation accuracy of the disclosed anti jamming GPS receiver antenna testing system in both GPS signal phase and satellite angular position with respect to the GPS receiver antenna under test is high. In some embodiments, only one time phase calibration is required at the beginning of each test.

In some embodiments, the disclosed anti jamming GPS receiver antenna testing system can include a set of circular rails with different radius that are installed to emulate GPS satellite orbits, a set of GPS antennas, each carried by a trolley, that can move on the rails to emulate GPS satellites, a trolley movement controller controlling the movement of trolleys on the rail to emulate the GPS satellite constellation propagation, and a multi-channel GPS simulation system that provides GPS signal and GPS satellite state information including GPS satellite position.

The GPS receiver antenna under test can be placed at the center of the rails. As the GPS antennas carried by the trolley move on the rail to emulate the GPS satellite constellation propagation, the GPS signals' arriving direction is almost the same as that coming from real GPS satellites. Thus, the emulated GPS signals received by the GPS receiver antenna under test can be used as the real GPS signals.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for testing satellite signal receiver antenna, comprising:
   determining a satellite constellation state indicating status of a plurality of satellites in a satellite constellation;
   calculating based on the determined satellite constellation state, initial positions of the plurality of satellite antennas that are used for emulating the satellite constellation;
   moving the plurality of satellite antennas to the initial positions of the plurality of satellite antennas;
   calibrating, by a computer, a phase delay of each of the plurality of satellite antennas;
   broadcasting, by the plurality of satellite antennas, satellite signals to test a satellite signal receiver antenna performance;
   using a rail to emulate an orbit of each of the plurality of satellites in the satellite constellation;
   determining, by a computer, a movement plan for the plurality of satellite antennas based on the satellite constellation state by performing:
      extracting expected positions of the plurality of satellites in the satellite constellation at a next time point from the satellite simulation system;
      calculating expected positions of the plurality of satellite antennas on the rail to emulate the expected angular positions of the plurality of satellites in the satellite constellation at the next time point;
      measuring current positions of the plurality of satellite antennas on the rail; and determining the movement plan for moving each satellite antenna from the current position to the expected position on the rail, respectively, based on the current positions of the plurality of satellite antennas on the rail, and the expected positions of the plurality of satellite antennas on the rail at the next time point; and moving the plurality of satellite antennas based on the movement plan to emulate a propagation of the satellite constellation.

2. The method of claim 1, wherein:

the satellite constellation is one of Global Positioning System (GPS), Global'naya Navigatsionnaya Sputnikovaya Sistema (GLONASS), Galileo positioning system, and BeiDou Navigation Satellite System; and the satellite constellation state at least includes orbits information of the satellites in the satellite constellation.

3. The method of claim 1, wherein moving the plurality of satellite antennas including moving a trolley carrying one of the plurality of satellite antennas on the rail.

4. The method of claim 1, wherein moving the plurality of satellite antennas further includes:

sending a control command to the trolley carrying one of the plurality of satellite antennas on the rail through a wireless communication channel; and in response to receiving the control command, moving the trolley carrying one of the plurality of satellite antennas on the rail at a constant speed.

5. The method of claim 1, wherein calculating initial positions of the plurality of satellites in the satellite constellation to determine initial positions of the plurality of satellite antennas includes:

calculating initial angular positions of the plurality of satellites in the satellite constellation in a global coordinate reference frame based on the determined satellite constellation state; and determining initial angular positions of the plurality of satellite antennas on the rail based on the initial angular positions of the plurality of satellites in the satellite constellation in the global coordinate reference frame.

6. The method of claim 1, wherein calibrating the phase delay of each of the plurality of satellite antennas includes:

measuring a phase delay for each of the plurality of satellite antennas;

calculating phase delay differences between the phase delay of one satellite antenna and other satellite antennas; and using the phase delay differences to calibrate the phase delay of each of the plurality of satellite antennas, such that the phase differences of the plurality of satellite antennas are eliminated or minimized.

7. The method of claim 1, wherein broadcasting the satellite signals includes:

generating satellite signals for the plurality of satellite antennas by a satellite simulation system; and transmitting the satellite signals to the plurality of satellite antennas through a plurality of radio frequency cables, wherein each radio frequency cable connects one of the plurality of satellite antennas to the satellite simulation system.

8. The method of claim 7, wherein moving the plurality of satellite antennas further includes:

releasing or retreating, by a cable management system, each radio frequency cable that connects one of the plurality of satellite antennas and the satellite simulation system.

9. The method of claim 1, wherein measuring current positions of the plurality of satellite antennas on the rail includes:

capturing, by a plurality of cameras, images of the plurality of satellite antennas on the rail;

processing the images captured by the multiple cameras to identify the plurality of satellite antennas; and obtaining current angular positions of the plurality of satellite antennas.

10. The method of claim 9, wherein obtaining the current angular positions of the plurality of satellite antennas includes:

measuring a current local angular position of one satellite antenna in an image in a local coordinate system with respect to a camera that captures the image; and calculating the current angular position of the one satellite antenna in a global coordinate reference frame based on the current local angular position of the one satellite antenna in the local coordinate system, a radius of a rail that the one satellite antenna is located, and a location of the camera in the global coordinate.

11. A system for testing satellite signal receiver antenna, comprising:

a plurality of satellite antennas configured for emulating a plurality of satellites in a satellite constellation;

a plurality of rails configured for emulating orbits of the plurality of satellites in the satellite constellation;

a satellite positioning system configured for determining a propagation of the plurality of satellites in the satellite constellation;

a satellite simulation system configured for generating emulated satellite signals and outputting the satellite constellation information;

wherein the plurality of satellite antennas are able to broadcast the emulated satellite signals while moving along the plurality of rails respectively based on the propagation of the plurality of satellites in the satellite constellation;

a plurality of cameras configured for capturing images of the plurality of satellite antennas;

a plurality of trolleys that are able to move on the plurality of rails respectively; and a computer configured for:

extracting satellite constellation state from an digital output of the satellite simulation system;

calibrating a phase delay of each of the plurality of satellite antennas;

processing the images of the plurality of satellite antennas to determine current positions of the plurality of satellite antennas;

determining a movement plan for the plurality of satellite antennas based on the current positions of the plurality of satellite antennas and the propagation of the plurality of satellites in the satellite constellation; and sending control commands to the plurality of trolleys to move the plurality of trolleys, such that movements of the plurality of satellite antennas carried by the plurality of trolleys emulate the propagation of the plurality of satellites in the satellite constellation.

12. The system of claim 11, further comprising:

a plurality of radio frequency cables for transmitting the emulated satellite signals from the simulation system to the plurality of satellite antennas;

wherein each of the plurality of radio frequency cables connects one of the plurality of satellite antennas and the satellite simulation system.

13. The system of claim 12, further comprising a cable management system configured for:
- releasing or retreating the plurality of radio frequency cables when the plurality of satellite antennas are moving along the plurality of rails respectively; and
- providing low phase and time delay change of the emulated satellite signals.

14. The system of claim 13, wherein:
- the cable management system includes a fixed pulley, a movable pulley, and a tension part;
- wherein a radio frequency cable is restrained by the fixed pulley, the movable pulley, and the tension part.

15. The system of claim 12, further comprising:
- a low noise amplifier between the plurality of radio frequency cables and the satellite simulation system;
- wherein the low noise amplifier is configured for amplifying emulated satellite signals to a desired strength level by compensating power losses due to the radio frequency cables and distances between the plurality of satellite antennas and a satellite signal receiver antenna under test.

16. The system of claim 11, further comprising:
- wherein each of the plurality of trolleys carries one of the plurality of satellite antennas.

17. The system of claim 11, wherein:
- the satellite constellation is one of Global Positioning System (GPS), Global'naya Navigatsionnaya Sputnikovaya Sistema (GLONASS), Galileo positioning system, and BeiDou Navigation Satellite System.

* * * * *